April 6, 1926.
G. E. HENNING
1,579,364
INDIVIDUAL BRIDGE WALL FOR FLOW SPOUTS
Filed March 2, 1925
4 Sheets-Sheet 1
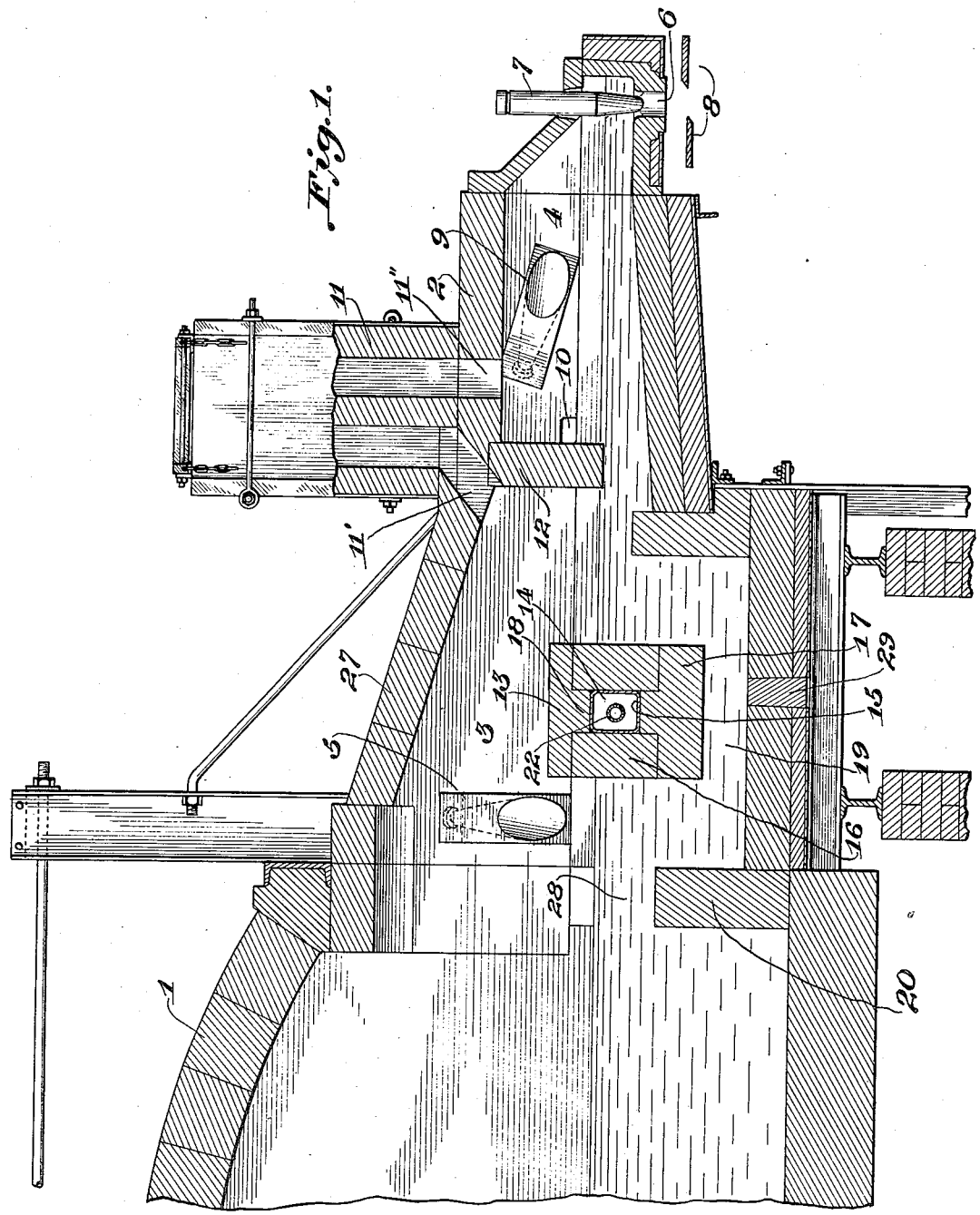
Inventor
Glen E. Henning.
By Eccleston & Eccleston
Attorneys

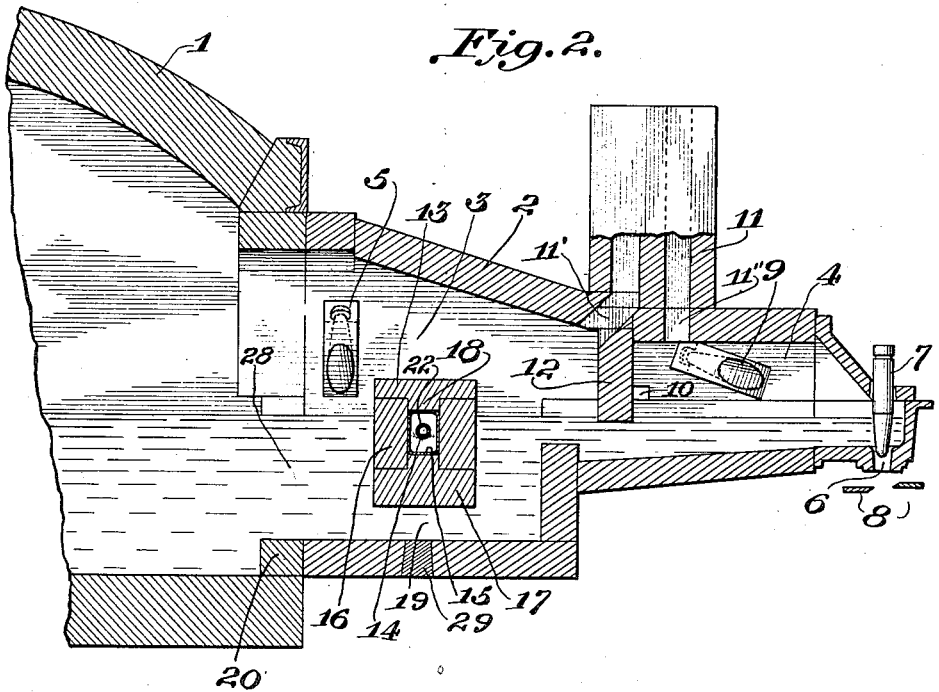
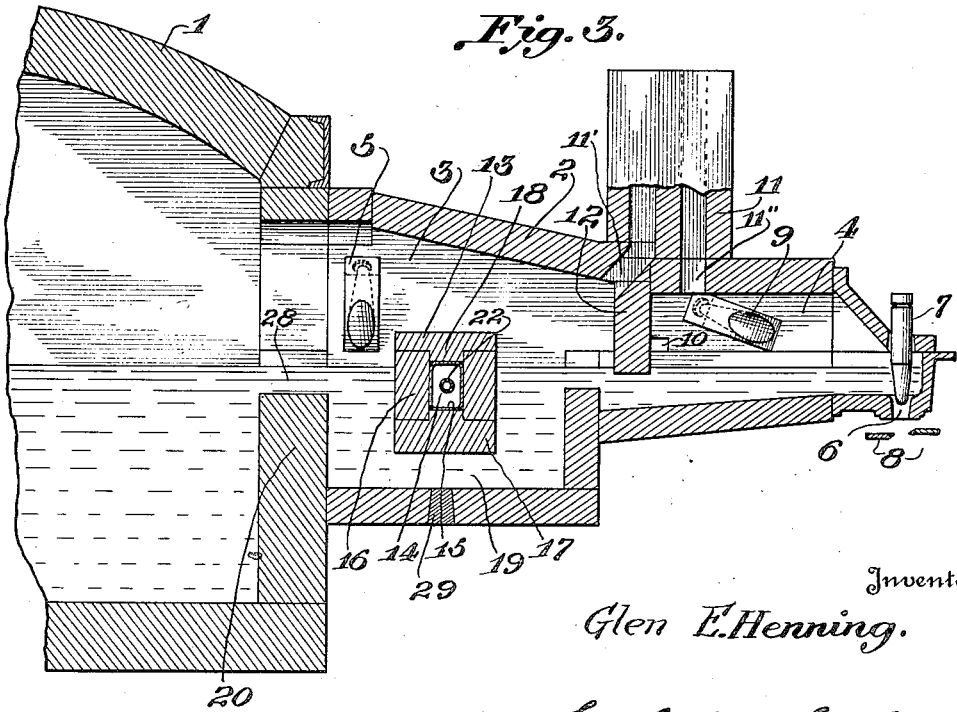

April 6, 1926.
G. E. HENNING
1,579,364
INDIVIDUAL BRIDGE WALL FOR FLOW SPOUTS
Filed March 2, 1925
4 Sheets—Sheet 3
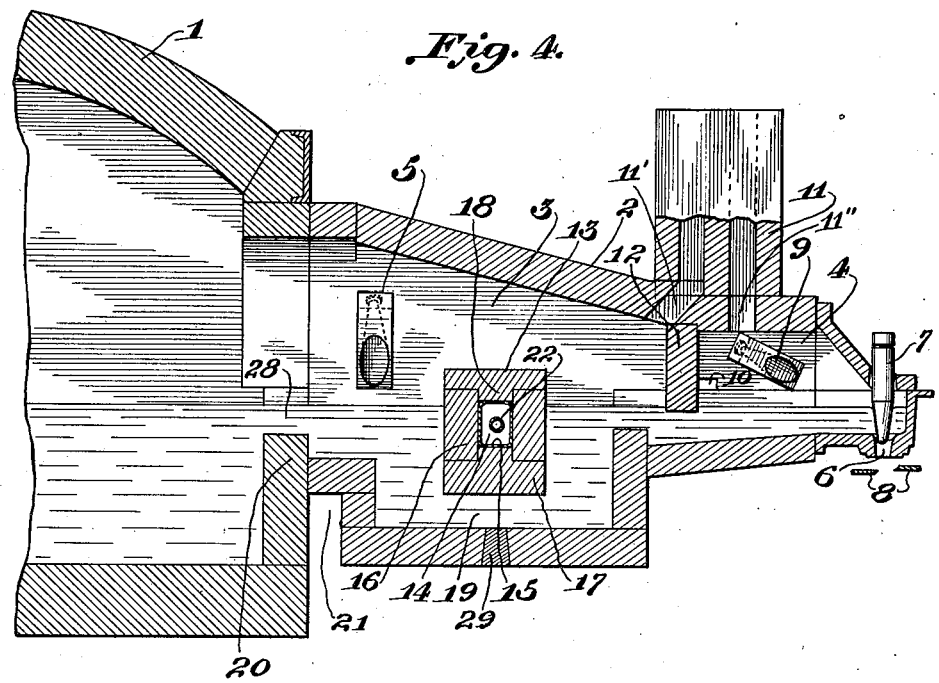
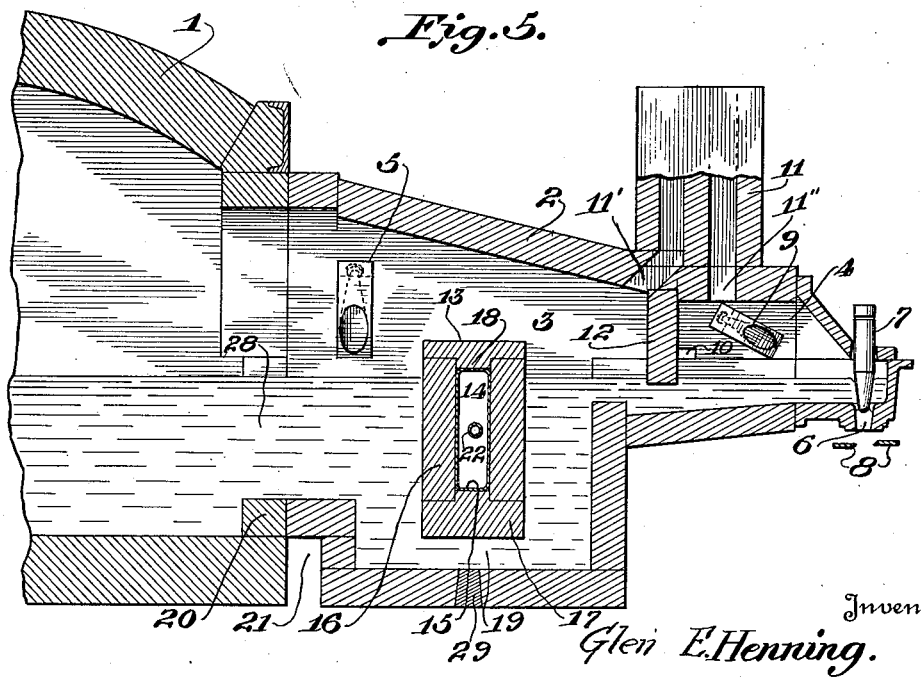
Inventor
Glen E. Henning.
By Eccleston & Eccleston
Attorneys April 6, 1926.
G. E. HENNING
1,579,364
INDIVIDUAL BRIDGE WALL FOR FLOW SPOUTS
Filed March 2, 1925     4 Sheets-Sheet 4
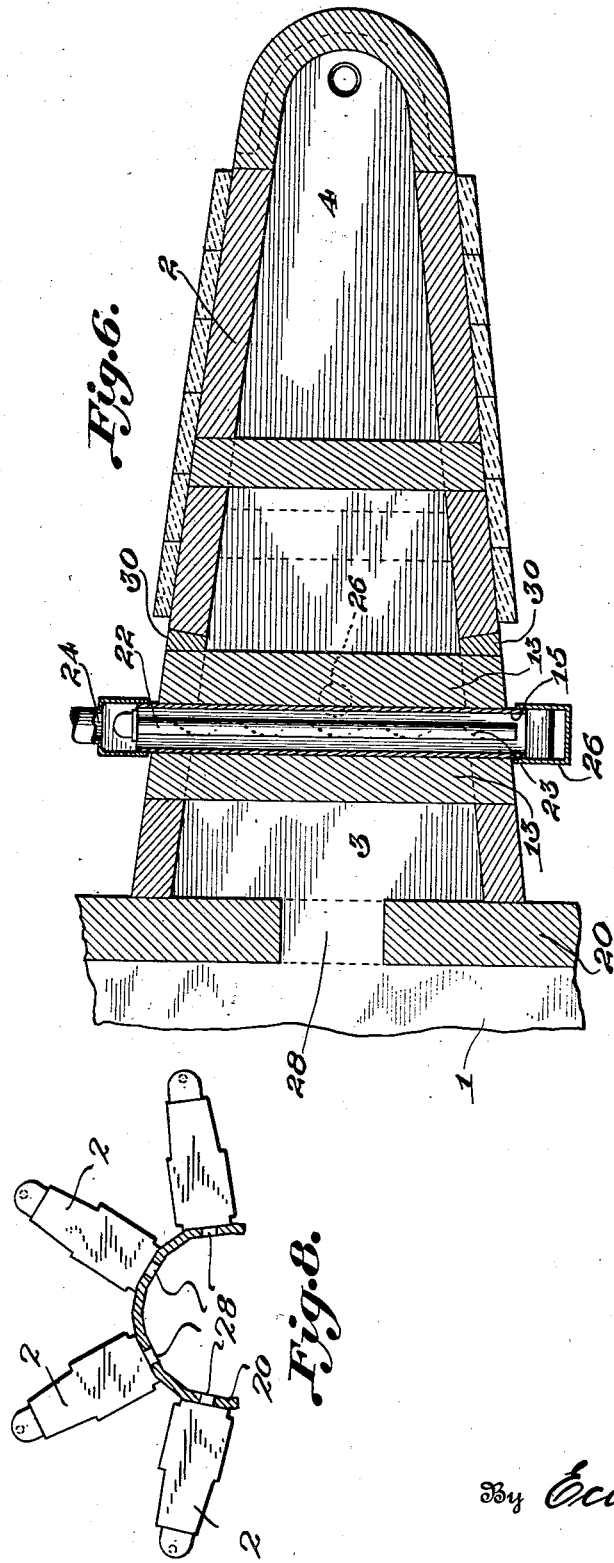
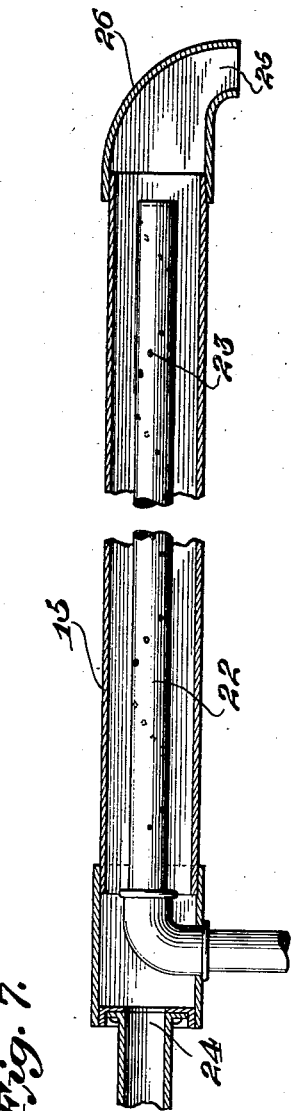
Inventor
Glen E. Henning.
By Eccleston & Eccleston
Attorneys Patented Apr. 6, 1926.

1,579,364

UNITED STATES PATENT OFFICE.

GLEN E. HENNING, OF WHEELING, WEST VIRGINIA, ASSIGNOR TO HAZEL-ATLAS GLASS CO., OF WHEELING, WEST VIRGINIA, A CORPORATION OF WEST VIRGINIA.

INDIVIDUAL BRIDGE WALL FOR FLOW SPOUTS.

Application filed March 2, 1925. Serial No. 12,679.

*To all whom it may concern:*

Be it known that I, GLEN E. HENNING, a citizen of the United States, residing at Wheeling, in the county of Ohio and State of West Virginia, have invented certain new and useful Improvements in Individual Bridge Walls for Flow Spouts, of which the following is a full, clear, and exact description.

The invention relates generally to individual bridge walls for flow spouts of glass furnaces, and to other improvements in the flow spout construction.

Prior to the present invention the uniform practice in the glass industry has been to employ a large tank divided into a melting section and a refining section, by means of a bridge wall extending transversely of the tank; or by means of the well known throat construction. The bridge wall, or throat, is provided with a flow hole through which all the glass in the melting tank must pass in order to reach the refining tank. The bridge or throat permits glass to flow into the refining tank from the lower portion only of the melting tank, and thus foreign substance, unmelted portions of the glass batch, etc., which float on the surface, are retained in the melting tank. It is thus obvious that the bridge wall or throat is subjected to heavy wear because of the friction and abrasion resulting from this large amount of glass flowing therethrough. Further, the bridge wall is wholly exposed to the fluxing action of the melting glass material, and is also subjected to the high temperature of the melting tank.

For the above reasons, namely; the fluxing action, the high temperature, and the frictional and abrasive action of the large volume of flowing glass; the bridge wall or throat is worn out prematurely; while the side walls and other parts of the tank usually remain in good condition for a much longer period. When a bridge is so worn that it can not longer function properly as a refining element for the glass, it is necessary to repair or rebuild the entire glass melting and refining tank; even though, as stated above, the walls and other parts of the tank may still be in good condition.

The shutting down of a melting tank involves a very heavy loss, for it usually requires several weeks to make the repairs, and during this period all of the flow spouts leading from the refining end of the melting tank, must be shut down.

The foregoing remarks will outline a few of the disadvantages of the apparatus which is now in general use; and I will now proceed to briefly set forth the objects and advantages of the present invention.

One of the objects of the invention is to entirely do away with the bridge wall formerly employed in melting and refining tanks; thereby decreasing the cost of the tank and increasing the life of the tank by omitting its shortest lived element.

Another object of the invention is to provide an individual bridge or throat in each of the plurality of flow spouts leading from the melting and refining tank; whereby the refining operation is individual to each flow spout.

Another object of the invention is to avoid the shutting down of all the flow spouts, and to provide a construction whereby it is necessary to shut down only that particular flow spout of which the individual bridge wall is in need of repairs.

Still another object of the invention is to provide a construction whereby the bridge in the flow spout may be removed with ease and rapidity, when repair or renewal becomes necessary.

A further feature of the invention resides in the provision of a new and improved cooling means for the bridge wall.

Another object of the invention is to mount the individual bridge wall in the flow spout at some distance from the front end wall of the main tank, instead of locating it at the intersection of the tank and flow spout. By thus spacing the bridge from the front end wall of the tank it is obvious that it will be subjected to the minimum of the fluxing action of the glass.

Another feature of the invention resides in so positioning the bridge in the flow spout, that the bridge and its cooling means are not only readily accessible but also visible.

Still another object of the invention resides in the provision of a skimmer block preferably employed in connection with the individual bridge; the functions of the skimmer block being to prevent any scum, or foreign material, from reaching the feeding portion of the flow spout, and also to prevent the passage of heat from the refining section of the flow spout to the feeding section thereof, whereby the temperature of the feeding section may be maintained constant by means of burners associated therewith.

Figure 1 is a longitudinal vertical sectional view of a flow spout provided with the individual bridge; the construction and arrangement being such that the glass is taken from a point between the top and bottom levels of the glass in the melting tank.

Figure 2 is a longitudinal vertical sectional view of a flow spout provided with the individual bridge; the construction and arrangement being such that the glass is taken from the extreme bottom of the glass in the melting tank.

Figure 3 is a longitudinal vertical sectional view of a flow spout provided with the individual bridge; the construction and arrangement being such that the glass is taken from the extreme top of the glass in the melting tank.

Figure 4 is a longitudinal vertical sectional view of a flow spout provided with the individual bridge; the construction and arrangement being substantially the same as that illustrated in Figure 3, except that the bottom of the flow spout is stepped down at a short distance from the melting tank.

Figure 5 is a longitudinal vertical sectional view of a flow spout provided with the individual bridge; the construction and arrangement being substantially the same as that illustrated in Figure 2, except that the bottom of the flow spout is stepped down at a short distance from the melting tank.

Figure 6 is a horizontal sectional view of the flow spout, taken through the bridge wall.

Figure 7 is a longitudinal sectional view of a specific form of cooling means for the bridge wall; and Figure 8 is a diagrammatic view showing a melting tank provided with a plurality of flow spouts.

Referring to the drawings more in detail, numeral 1 indicates the ordinary and well known melting tank. The illustrated tank differs from the conventional melting tank in one very important particular; this important difference being the omission of the usual bridge wall. As indicated hereinbefore the bridge wall is the shortest-lived element of the melting tank and by omitting that element the life of the tank as a whole is materially extended.

Numeral 2 refers generally to the usual flow spout which communicates with the tank 1. It is to be understood, of course, that in accordance with the usual practice there are a plurality of these flow spouts associated with each melting tank, as illustrated in Fig. 8.

In accordance with the present invention the flow spouts are divided into two parts, which will hereinafter be referred to as the refining portion of the flow spout, and the feeding portion of the flow spout.

The refining portion of the flow spout is indicated generally by the numeral 3, and contains the individual bridge wall to be described hereinafter. Burners 5 are provided in this portion of the flow spout for the purpose of securing the desired temperature. No invention is involved in the use of these burners, and they may be used in such number and arrangement to suit conditions.

The feeding portion of the flow spout is indicated generally by numeral 4, and it is divided from the refining portion by means of a skimmer block to be described hereinafter. The portion 4 of the flow spout is provided with the usual flow orifice 6, and mounted in vertical alignment with the flow orifice is the usual feed controlling plunger 7. In accordance with the established practice the feed controlling plunger 7 is reciprocated in vertical alignment with the flow orifice, thereby feeding glass gobs to the forming machines in the well known manner. Any desired means are employed for reciprocating the plunger; the upper and lower limits of the plunger stroke being independently adjustable while the machine is in motion; and the plunger also being laterally adjustable while the machine is in operation to maintain it in proper alignment with the flow orifice. The flow orifice 6 is ordinarily provided with a removable bushing (not shown), and arranged below the flow orifice are the usual shears 8 for severing the glass gobs. It will be understood that no invention is involved in the means for reciprocating and adjusting the plunger, and it has therefore been deemed advisable not to illustrate any particular means; for a great variety of means for reciprocating and adjusting the plunger are old and well known, and the present invention includes the use of any of such means.

Burners 9 are mounted in the feeding portion of the flow spout, and it is to be understood that the number and arrangement of the burners are varied to suit conditions. The feeding portion of the flow spout is also provided with an air vent 10 for supplying combustion air to the burners.

A chimney 11 is provided on top of the flow spout at substantially the dividing line between the refining section and feeding section of the spout; and by this arrangement it is possible to have passages 11' and 11", leading from the refining section and feeding section, to the common chimney 11, for carrying off the products of combustion. The chimney may be provided with a single flue common to both passages 11' and 11", or individual flues, as illustrated, may be employed.

The burners and air vents, referred to above, are well known in the art, and no broad claim is made covering their use. But it is believed to be new to provide these elements in the feeding portion of the flow spout, which feeding portion is entirely separated from the remainder of the flow spout, and the construction by which this is accomplished will now be described.

At the desired point in the flow spout I provide a skimmer block 12, which extends the entire width of the spout, and which reaches from the top of the spout downwardly to a point slightly below the level of the glass. One of the functions of this skimmer block is, as its name implies, to prevent any scum, etc., on the glass from passing to the feeder. But this block has another function, which involves an important improvement in the glass art. For various reasons, which are well known to those skilled in the art, it is desirable to maintain glass in the melting tank and in the flow spouts, at a certain temperature, and to vary this temperature under certain conditions. In other words the temperature of the glass in the tank and flow spouts should be under perfect control at all times. It is even more important, however, that the glass in the feeding portion of the flow spout should be maintained constant and regulable, for any uncontrolled fluctuations in the temperature would affect the size and shape of the glass gobs. By the use of the aforementioned skimmer block I have substantially cut off heat communication between the feeding portion of the flow spout and the refining portion thereof; and thus it is obvious that the desired temperature may always be maintained and controlled by the use of the burners 9.

The use of an individual bridge for each flow spout in combination with a bridgeless tank constitutes the main feature of the present invention, and that construction will now be described.

The individual bridge is indicated generally by the numeral 13, and is made of clay or other desired material. For the purpose of cooling the bridge and thus extending its life, it is formed hollow so that there is a passage 14 extending from end to end thereof, through which passage water, air or other cooling medium is caused to flow. The passage is preferably provided with a metallic or other lining 15.

The invention is, of course, not limited to any specific cooling means for the bridge wall, but I have illustrated herein a preferred form of cooling means; reference being had particularly to Figures 6 and 7 for a disclosure of the specific construction. Referring now to those figures, numeral 15 indicates the metallic lining or tube extending through the bridge 13, and mounted in this member is a pipe 22 provided with perforations 23, which spray water or other cooling liquid on the walls of the member 15. Provided at one end of the member 15 is an air inlet 24, by which air or other fluid under pressure is admitted and exerts a cooling influence by carrying off toward the outlet 25 the spray and steam which may be generated. The outlet 25 is preferably formed by the elbow cap 26 which is removably mounted on the end of the member 15. By means of this construction the cap may be removed at intervals, thereby giving access to the interior of the member 15, and permitting the easy removal of sludge, sediment, or scale, which forms or is deposited on the interior of the metallic tube 15. Thus by the removal of any matter which would tend to destroy the heat conductivity, it is possible to maintain the cooling apparatus in efficient operation.

It will be understood, of course, that the invention is not in any manner limited to any particular construction of the individual bridge wall; but for purposes of illustration I have shown the bridge as formed of two spaced side blocks 16, 16, associated with top and bottom blocks 17, 17; the top and bottom blocks preferably having spacing ribs 18 for maintaining the side blocks in proper spaced relation. Obviously the individual bridge may be constructed in any manner desired; being formed of a single integral piece, or built up of separate pieces of any suitable shape or size. As clearly shown in Figure 6, the bridge wall is adapted to be supported by the side walls of the flow spout.

The individual bridge 13 extends transversely of the flow spout, and is spaced from the bottom thereof to leave a throat 19. This throat constitutes the passage through which the glass must flow to reach the feeding portion of the flow spout. And as the bridge extends to a considerable distance below the surface of the glass it is evident that it will prevent foreign matter, unmelted portions of the glass batch, etc., floating on the surface of the glass, from passing into the feeding portion of the flow spout.

The individual bridge walls are spaced some distance from the front wall of the melting tank, and by thus spacing it the bridge wall is not directly subjected to the fluxing action of the glass, or to the intense heat of the melting tank; and the life of these individual bridges is thus materially extended over the life of the old bridges which have been provided in the melting tank for dividing the tank into melting and refining sections.

The glass may be taken from the extreme top of the glass in the melting tank, or from the bottom thereof, or from any intermediate portion thereof. And it is largely for the purpose of illustrating such constructions that I have shown various longitudinal sectional views of the apparatus. Referring to Figure 1 it will be seen that the front wall 20 of the melting tank extends from the bottom of the tank to a point somewhat above the center of the glass, so that the glass to a considerable depth will flow into the flow spout. Referring to Figure 2 it will be seen that the front wall 20 is substantially omitted; it being extended upwardly only to the plane of the spout bottom; so that practically the entire depth of glass in the melting tank will flow into the various flow spouts communicating therewith. Referring to Figure 3 it will be seen that the front wall 20 extends upwardly to a point adjacent the surface of the glass, so that only the glass at the extreme top is permitted to flow into the flow spout. The construction shown in Figure 4 is substantially the same as that illustrated in Figure 3, except that the flow spout is spaced from the front of the melting tank, as indicated by numeral 21. The construction shown in Figure 5 is substantially the same as that illustrated in Figure 2, except that the flow spout is spaced from the front of the melting tank, as indicated by numeral 21. It is also to be noted that the relative length of the refining portions and feeding portions of the flow spouts differ in the various constructions illustrated; also that the height of the flow spout, and the height and width of the individual bridge walls, differ in different installations.

It is also to be understood that the invention is not in any way limited to the particular forms of individual bridge walls illustrated in the accompanying drawings, as the invention covers broadly the combination of a bridgeless tank and flow spouts provided with individual bridges. For example, instead of employing individual bridges such as illustrated herein, the invention contemplates the use of such bridge constructions as illustrated in the application of Robert Good, Serial No. 747,360 filed November 1, 1924; and in the use of such bridge it would, of course, be spaced from the front wall of the melting tank which is in accordance with one of the novel features of the present invention.

In the operation of the constructions described herein, the melting tank will have its usual bridge omitted, thereby extending the life of the tank as hereinbefore described; and the molten glass will flow freely from the tank into the flow spout. After it enters the flow spout it will be caused to flow beneath the individual bridge whereby the glass is refined in the well known manner. By spacing the bridge from the front wall of the tank it is not subjected to the fluxing actions of the glass or to the extreme heat of the tank. And as there are a plurality of flow spouts communicating with each tank, and as each flow spout is provided with an individual bridge; it is apparent that if any individual bridge needs to be repaired or renewed it is only necessary to shut off that particular flow spout, and the remaining flow spouts continue in operation. While in accordance with the old practice if the bridge in the melting tank needed repair or renewal it was necessary to shut down the tank and consequently put out of operation all of the flow spouts communicating therewith. And, of course, as each flow spout accomplishes its own refining operation; it is apparent that the individual bridges are not subjected to nearly the same wear as the old bridge of the melting tank: for in accordance with the old practice it was necessary for all the glass for all the flow spouts to flow beneath the one bridge in the melting tank.

However, the bridge is subjected to more wear than any other part of the flow spout and it will therefore be necessary at times to repair or renew the bridge. I have provided means whereby at a minimum expense and delay of operation, the bridge may be removed without the necessity of dismantling the whole spout. The removal of the bridge is accomplished as follows:

Before removing the bridge wall it is necessary to cut off the flow of glass to the flow spout, and to do this, one of the tiles, such as indicated by numeral 27, is removed, and a water cooled stopper is inserted to freeze the glass at the throat 28. A removable plug 29 is provided in the bottom of each flow spout, and after the glass in the throat 28 has been frozen the plug is removed and the molten glass is drained from the spout. The bridge wall is locked in place by means of key blocks 30, 30; and now to remove the bridge it is only necessary to remove the key blocks, thereby giving ample clearance to facilitate the removal of the old bridge and for the installation of a new bridge. After the new bridge has been istalled the keys 30, 30 are mounted in position, the plug 29 is restored, and the spout is ready for operation. Obviously the facility with which the individual bridge walls may be renewed cuts down to a very great extent the loss of time due to shut downs. In other words, in the old practice it was necessary to shut down all the flow spouts for several weeks while a new bridge was being installed in the melting tank; while in accordance with the present construction it is only necessary to shut down the particular flow spout in which the bridge needs renewal; and further, the time which the particular flow spout must be shut down is reduced to a minimum by reason of the simple method of removal and renewal described herein.

After the glass has been refined in the flow spout by passing beneath the individual bridge, it flows on to the feeding portion of the flow spout, but before entering this portion of the flow spout it must pass beneath the skimmer block which accomplishes the final refining action by preventing any scum or the like from entering the feeding portion of the flow spout. The skimmer block also cuts off the direct flow of heat from the melting tank and refining portion of the flow spout to the feeding portion of the flow spout. By this construction the temperature of the feeding portion may be maintained constant, and will not be effected by temperature fluctuations in the melting tank and refining portion of the flow spout. The temperature of the feeding portion of the flow spout may then be accurately controlled by the proper use of the burners hereinbefore described.

From the feeding portion of the flow spout the glass passes through the flow orifice, and is then formed into gobs by the reciprocating plunger; the gobs being then sheared and fed to the forming machines in the usual and well known manner, or in any manner desired.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In a glass furnace, the combination of a bridgeless tank, a flow spout communicating therewith, and an individual bridge wall provided in said flow spout.

2. In a glass furnace, the combination of a bridgeless tank, a plurality of flow spouts communicating therewith, and an individual bridge wall provided in each of said flow spouts.

3. In a glass furnace, the combination of a bridgeless tank, a flow spout communicating therewith, and an individual bridge wall provided in the flow spout, said individual bridge being spaced from the front wall of the tank.

4. In a glass furnace, the combination of a tank, and a flow spout communicating therewith, said flow spout being divided into two substantially non-heat-exchanging sections.

5. In a glass furnace, the combination of a tank, a flow spout communicating therewith, and a skimmer block dividing said flow spout into two substantially non-heat-exchanging sections.

6. In a glass furnace, the combination of a bridgeless tank, and a plurality of flow spouts communicating therewith, said flow spouts being divided into two substantially non-heat-exchanging sections, one of said sections being employed for refining the glass, and the other of said sections being employed for feeding the glass to the forming machines.

7. In a glass furnace, the combination of a bridgeless tank, a flow spout communicating therewith, a skimmer block dividing said flow spout into two substantially non-heat-exchanging sections, and an individual bridge wall mounted in one of said sections.

8. In a glass furnace, the combination of a bridgeless tank, a flow spout communicating therewith, a skimmer block dividing the flow spout into a refining section and a feeding section, an individual bridge mounted in the refining section, and glass feeding means provided in the feeding section.

9. A flow spout for glass furnaces, including a feeding section and means for separating said section from the remainder of the flow spout.

10. A flow spout for glass furnaces, including a feeding section, and a transversely arranged block separating said feeding section from the remainder of the flow spout.

11. A flow spout for glass furnaces, including a feeding section, a transversely arranged block separating said feeding section from the remainder of the flow spout, and a burner provided in the feeding section of the flow spout to control the temperature thereof.

12. A flow spout for glass furnaces having a flow orifice, a plug for controlling the flow of glass through said orifice, and an individual bridge for refining the glass in the flow spout.

13. A flow spout for glass furnaces having a flow orifice, a plug for controlling the flow of glass through said orifice, an individual bridge for refining the glass in the flow spout, and means for cooling said bridge.

14. A flow spout for glass furnaces, including a bridge for refining the glass in the flow spout, said bridge being spaced from the rear end of the flow spout, and means for cooling the bridge.

15. A flow spout for glass furnaces, including a skimmer block dividing the flow spout into two sections, and glass refining means provided in one of said sections.

16. A flow spout for glass furnaces, including a skimmer block dividing the flow spout into two sections, glass refining means provided in one of said sections, and glass feeding means provided in the other of said sections.

17. A flow spout for glass furnaces, including a skimmer block dividing the flow spout into two sections, and an individual bridge wall mounted in one of said sections.

18. A flow spout for glass furnaces, including a skimmer block dividing the flow spout in two sections, an individual bridge mounted in one of said sections, and a burner mounted in the other of said sections.

19. A flow spout for glass furnaces, including a skimmer block dividing the flow spout into two sections, and a chimney common to both sections.

20. A flow spout for glass furnaces, said flow spout comprising a refining section and a feeding section, and a chimney common to both sections.

21. A flow spout for glass furnaces, including a feeding section, means for separating said section from the remainder of the flow spout, and a chimney communicating with said section.

22. In a glass furnace, a bridge wall having a passage therethrough, means for spraying the walls of said passage with a liquid, and means for supplying a fluid under pressure to said passage.

23. In a glass furnace, a flow spout, an individual bridge wall for the flow spout, said bridge wall having a passage therethrough, a liquid spray for said passage, and means for supplying a fluid under pressure to said passage.

24. In a glass furnace, a bridge wall, a tubular member arranged in the bridge wall, a perforated pipe arranged in the tubular member and adapted to spray the latter, and a removable elbow on one end of the tubular member, whereby the tubular member may be cleaned when the elbow is removed.

25. In a glass furnace, a bridge wall, a tubular member arranged in the bridge wall, a perforated pipe arranged in the tubular member and adapted to spray the latter with water, an inlet pipe for supplying air under pressure to the tubular member, and an elbow constituting an outlet for the air, water and steam generated, said elbow being removable to permit cleaning of the tubular member.

26. In a glass furnace, a flow spout, an individual bridge wall for said flow spout, and means to permit removal and insertion of the bridge wall through a side wall of the flow spout.

27. In a glass furnace, a flow spout, and an individual bridge wall for the flow spout, said bridge being supported in the side walls of the flow spout.

28. In a glass furnace, a flow spout, an individual bridge wall for the flow spout, and key blocks for locking the bridge in position.

29. In a glass furnace, a flow spout, an individual bridge wall for the flow spout, said bridge mounted in the side walls of the flow spout, and key blocks adjacent the bridge for locking the latter in place, said key blocks being removable to permit removal and insertion of the bridge wall through a side wall of the flow spout.

30. In a glass furnace, a flow spout, an individual bridge for said flow spout said flow spout having an opening in the bottom thereof for draining off the glass, and a plug for closing said opening.

31. In a glass furnace, a flow spout, an individual bridge wall for said flow spout, the bottom of the flow spout having an opening therein, said opening arranged beneath the individual bridge, and a plug for closing the opening.

32. In a glass furnace, a flow spout, said flow spout divided into a refining section and a feeding section, a bridge wall provided in the refining section, and means for draining off the glass in the refining section.

33. In a glass furnace, a flow spout, said flow spout having a refining section, and means for draining off the glass from the refining section.

34. The method of removing bridge walls from flow spouts which consists in first freezing the glass at the inlet to the flow spout, then draining the molten glass from the flow spout, and then removing the bridge wall through a side of the flow spout.

35. The method of removing bridge walls from flow spouts which consists in first shutting off the flow of glass to the flow spout, then draining the molten glass from the flow spout, and then removing the bridge wall through a side of the flow spout.

36. The method of renewing bridge walls in flow spouts which consists in first freezing the glass at the inlet to the flow spout, then draining the molten glass from the flow spout, then removing key blocks from the sides of the flow spout, then removing the bridge wall through a side wall of the flow spout, and inserting a new bridge wall in its place.

GLEN E. HENNING.

DISCLAIMER.

1,579,364.—*Glen E. Henning*, Wheeling, W. Va. INDIVIDUAL BRIDGE WALL FOR FLOW SPOUTS. Patent dated April 6, 1926. Disclaimer filed August 9, 1926, by the assignee, *Hazel-Atlas Glass Company*.

Hereby enters this disclaimer to claims 4, 5, 9, 10, 11, 19, and 21 in said patent, which claims are in the following words, to wit:

"4. In a glass furnace, the combination of a tank, and a flow spout communicating therewith, said flow spout being divided into two substantially non-heat-exchanging sections.

"5. In a glass furnace, the combination of a tank, a flow spout communicating therewith, and a skimmer block dividing said flow spout into two substantially non-heat-exchanging sections.

"9. A flow spout for glass furnaces, including a feeding section and means for separating said section from the remainder of the flow spout.

"10. A flow spout for glass furnaces, including a feeding section, and a transversely arranged block separating said feeding section from the remainder of the flow spout.

"11. A flow spout for glass furnaces, including a feeding section, a transversely arranged block separating said feeding section from the remainder of the flow spout, and a burner provided in the feeding section of the flow spout to control the temperature thereof.

"19. A flow spout for glass furnaces, including a skimmer block dividing the flow spout into two sections, and a chimney common to both sections.

"21. A flow spout for glass furnaces, including a feeding section, means for separating said section from the remainder of the flow spout, and a chimney communicating with said section."

[*Official Gazette August 24, 1926.*]